(12) United States Patent
Ruziak et al.

(10) Patent No.: US 6,256,296 B1
(45) Date of Patent: *Jul. 3, 2001

(54) NETWORK COMMUNICATIONS LINK

(76) Inventors: Yaron Ruziak, 4 Hapalmach Street, Avihail 42910 (IL); Haim Eder, 8 Zaidman Street, Kiryat Ono 55238 (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/992,934

(22) Filed: Dec. 17, 1997

(51) Int. Cl.[7] .............................. H04B 10/02; H04J 14/00
(52) U.S. Cl. ....................... 370/277; 359/154; 359/172; 375/222; 379/56.3
(58) Field of Search .................................. 370/401, 338, 370/461, 337, 276, 280, 277, 278; 375/222; 359/172, 152, 154, 155; 379/56.1, 56.2, 56.3; 455/552, 553

(56) References Cited

U.S. PATENT DOCUMENTS

| | | |
|---|---|---|
| 4,633,522 | 12/1986 | Yamamoto et al. . |
| 4,717,913 | 1/1988 | Elger . |
| 4,809,359 | 2/1989 | Dockery . |
| 4,864,647 | 9/1989 | Harrington . |
| 4,977,618 | 12/1990 | Allen ..................................... 455/607 |
| 4,977,619 | 12/1990 | Crimmins ............................. 455/607 |
| 5,099,346 | 3/1992 | Lee et al. . |
| 5,142,396 | 8/1992 | Divjak et al. . |
| 5,241,410 * | 8/1993 | Streck et al. ........................... 359/176 |
| 5,276,703 | 1/1994 | Budin ...................................... 375/1 |
| 5,481,249 | 1/1996 | Sato . |
| 5,528,391 | 6/1996 | Elrod . |
| 5,543,961 | 8/1996 | Smith . |
| 5,564,020 | 10/1996 | Rossi . |
| 5,565,855 | 10/1996 | Knibbe . |
| 5,566,022 | 10/1996 | Segev . |
| 5,617,236 | 4/1997 | Wang et al. . |
| 5,625,883 * | 4/1997 | Leyten et al. ........................... 455/41 |
| 5,724,106 | 3/1998 | Autry ..................................... 348/734 |
| 5,724,168 | 3/1998 | Oschmann et al. . |
| 5,734,487 | 3/1998 | Rossi . |
| 5,737,690 | 4/1998 | Gutman . |
| 5,838,472 | 11/1998 | Welch ................................... 359/155 |
| 5,857,760 | 1/1999 | Pelton .................................... 362/32 |
| 5,873,039 * | 2/1999 | Najafi ................................... 455/454 |

OTHER PUBLICATIONS

Kaveh Pahlavan, wireless information networks, p. 422, Jan. 1995.
Brochure: Controlan System, "Your Link With Tomorrow", MOLDAT Technologies and International Trading (1988) Ltd.
Brochure: Androdat System, Infrarot–Datenkommunikation: Information, Immer am Richtigen Ort.
Brochure: Controlan System, "Your Link With Tommorow", MOLDAT Technologies and International Trading (1988) Ltd.
Brochure: Androdat System, Infrarot—Datenkommunikation: Information, Immer am Richtigen Ort.

* cited by examiner

Primary Examiner—Alpus H. Hsu
(74) Attorney, Agent, or Firm—Amster, Rothstein & Ebenstein

(57) ABSTRACT

A wireless communications link, including a base unit and at least one remote unit. The base unit is connected to a wired communications line, so as to receive electrical signals from the line and transmit diffuse infrared radiation, modulated responsive to the received electrical signals, and to receive modulated infrared radiation and transmit electrical signals over the communications line responsive to the received infrared radiation. The at least one remote unit is connected to an audiovisual device, and couples the device to the communications line by receiving the modulated infrared radiation transmitted by the base unit and transmitting modulated diffuse infrared radiation to the base unit.

9 Claims, 6 Drawing Sheets

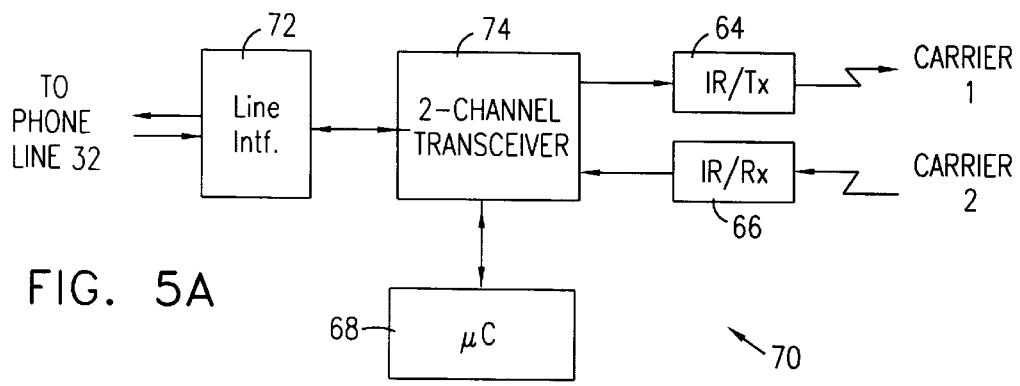
FIG. 5A
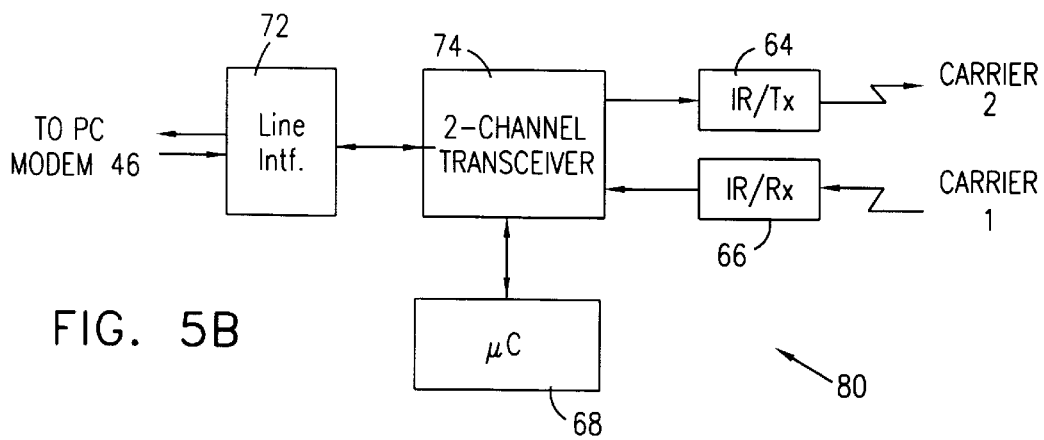
FIG. 5B
FIG. 5C
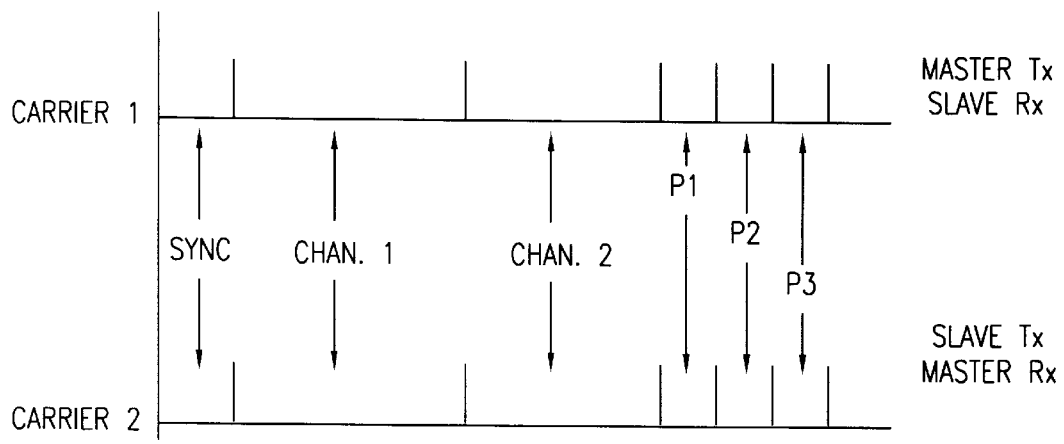

NETWORK COMMUNICATIONS LINK

FIELD OF THE INVENTION

The present invention relates generally to communication networks, and specifically to wireless communication networks based on infrared radiation.

BACKGROUND OF THE INVENTION

The Internet is the world's fastest developing mass media channel. Not only are increasing numbers of home computer users using the Internet, but most major television manufacturers are also developing or introducing Internet-connectable television sets. Since Internet connections are made primarily over telephone lines, any Internet-connectable device, whether a television or a conventional computer, must generally be placed in proximity to an existing telephone outlet, or telephone wires must be run to the location of the device.

Wireless computer communication devices and systems are known in the art. For example, cellular modems may be used without the need for telephone wires, but such modems are expensive both to purchase and to use. Elcom Technologies, of Canada, has recently announced the "EZONLINE" modem, which operates by modulating AC power lines, but this new technology is not yet widely used or available, nor is it really wireless, since it simply uses the AC lines in place of the telephone wires.

A number of industry standards have also been developed for wireless infrared (IR) computer communications, including ASK, IrDA 1.0/1.1 and new, emerging standards, such as an IR bus for control of computer peripherals. Existing IR wireless communications links generally operate at low speed, however, and carry only limited digital signals, rather than video and voice information. A clear line of sight (LOS) is generally required between the two ends of the link.

Computer local area networks (LANs) based on diffuse infrared transmission are also known in the art, for example, the ControLan System, produced by Moldat of Lod, Israel, and the AndroDat System produced by Androdat GmbH of Puchheim, Germany. Diffuse signals, in contrast to direct signals, are transmitted in all directions, and therefore can create a communication link with any receiver within a given radius of the transmitter. However, the above-mentioned diffuse IR systems require ceiling-mounted relay units, which need to be fixedly mounted and connected to a source of electrical power. Generally speaking, they are not suited for connection of a single computer or Internet-enabled television to a communication line in a home or small office.

SUMMARY OF THE INVENTION

It is an object of some aspects of the present invention to provide improved devices and systems for wireless computer communications.

It is another object of some aspects of the present invention to provide a wireless link between a television set and a computer network, such as the Internet.

It is a further object of some aspects of the present invention to provide a wireless control link between a television set or a computer and peripheral devices associated therewith.

It is still a further object of some aspects of the present invention to provide devices and systems for wireless telephone communications within a home or office.

It is an additional object of some aspects of the present invention to provide wireless communication devices and systems that do not require a clear line of sight between the communication devices.

In preferred embodiments of the present invention, a wireless IR communications link comprises a base unit and one or more remote units. The base and remote units communicate with one another by transmitting and receiving modulated, diffuse IR radiation. The base unit is connected to a wired communication line, such as a telephone line. Each of the remote units is preferably connected to a respective audiovisual device, such as a PC or a suitably-equipped television set, or to a peripheral device, such as a keyboard, associated with such an audiovisual device. The communications link allows the audiovisual device or devices to receive and send signals over the communications line, without any wired connection to the line. The peripheral device may be used to control and interact with the audiovisual device, similarly without the need for a wired connection therewith.

Unlike IR data links known in the art, the communications link of the present invention operates at high speed, preferably between 192 kbps and 2 Mbps, most preferably at least 1 Mbps, suitable for interactive multimedia transmission. The link may therefore be used to couple the audiovisual device to a network, such as the Internet, via the telephone line or other suitable data line, including ISDN and PTSN lines, as are known in the art. The link is also suitable for conveying voice communications.

Furthermore, because the link is based on transmission and reception of diffuse IR radiation, there need not be a clear line of sight between the base and remote units. The radiation transmitted by one of the units is received by the other unit after reflection (generally diffuse reflection) from one or more surfaces in a vicinity of the units. The link is preferably used in an enclosed, indoor area, in which the IR radiation is reflected from the walls and ceiling of the area. There is no need for IR relay units mounted on the ceiling or on other surfaces, as in diffuse IR systems known in the art, and no requirement for any special wiring or installation.

In some preferred embodiments of the present invention, the base unit is fixed to a telephone wall outlet, and one of the one or more remote units is fixed to a personal computer (PC) or an Internet-enabled television set. The communications link enables a user of the PC or television set to connect to a computer network, preferably the Internet, and to browse and view multimedia programs transmitted on the network.

Although in some preferred embodiments, only a single remote unit may be used, in other preferred embodiments of the present invention, the link connects the base unit with multiple remote units simultaneously. The base unit may communicate with the multiple remote units one at a time, in sequence, or over multiple, parallel channels. One of the units, preferably one of the remote units that is connected to a PC or Internet-enabled television, is assigned to serve as a master unit, which synchronizes and monitors transmissions from the other units. Preferably, each of the units transmits during a predetermined time slot, in accordance with a time-division multiple access (TDMA) scheme. In this manner, multiple units, preferably up to four units, but alternatively even greater numbers of units, can be linked simultaneously substantially without mutual interference.

Although preferred embodiments are described herein with reference to certain types of audiovisual devices and their connection primarily to telephone communication lines, it will be appreciated that the principles of the present invention may similarly be applied to produce wireless, diffuse IR communication links for other purposes. For example, such communications links may be used to connect a cordless telephone handset to a receiver, or to connect a portable Personal Digital Assistant (PDA) to a desktop computer, or to connect a digital camera to a PC or a printer. IR communication links in accordance with the principles of the present invention may carry either digital or analog data, and may operate in either half-duplex or full-duplex mode.

There is therefore provided, in accordance with a preferred embodiment of the present invention, a wireless communications link, including:

a base unit, which is connected to a wired communications line, so as to receive electrical signals from the line and transmit diffuse infrared radiation, modulated responsive to the received electrical signals, and to receive modulated infrared radiation and transmit electrical signals over the communications line responsive to the received infrared radiation; and at least one remote unit, which is connected to an audiovisual device, and which couples the device to the communications line by receiving the modulated infrared radiation transmitted by the base unit and transmitting modulated diffuse infrared radiation to the base unit.

Preferably, the at least one remote unit includes a plurality of remote units. Preferably, the base unit and the plurality of remote units communicate using a TDMA scheme.

In a preferred embodiment, a peripheral device is connected to one of the plurality of remote units. Preferably, the peripheral device includes a user interface device. Alternatively or additionally, the peripheral device includes a digital camera.

Preferably, the audiovisual device includes a web-enabled television, or a personal computer, or a personal digital assistant.

Preferably, the wired line couples the base unit to a telephone network and/or to the Internet.

In a preferred embodiment the base unit and the at least one remote unit transmit and receive data at a rate greater than or equal to 1 Mbps. Preferably the base unit and the at least one remote unit transmit and receive data in a half-duplex mode, or, alternatively, in a full-duplex mode.

In a preferred embodiment, at least one of the base and the at least one remote units includes an infrared receiver for receiving the modulated infrared radiation, which includes:

an optical detector; and a non-imaging dielectric concentrator, which has an entrance surface and an exit surface bonded to the detector, wherein the concentrator collects the modulated infrared radiation with a substantially uniform collection efficiency over a predetermined acceptance angle and concentrates the collected radiation onto the detector.

Preferably, at least a portion of the collected radiation is totally internally reflected by a side wall of the concentrator before striking the detector. Alternatively, the concentrator includes a parabolic side wall, from which the collected radiation is reflected before striking the detector.

Preferably, the entrance surface of the concentrator is substantially flat or, alternatively, it is convex.

There is additionally provided, in accordance with a preferred embodiment of the present invention, a method for linking an audiovisual device to a wired communications line, without a wired connection therebetween, including;

receiving electrical signals over the communications line;

transmitting diffuse infrared radiation to the audiovisual device, modulated responsive to the received electrical signals;

receiving modulated diffuse infrared radiation from the audiovisual device; and transmitting electrical signals over the communications line responsive to the received infrared radiation.

Preferably, transmitting and receiving diffuse radiation includes transmitting and receiving radiation in the absence of a line of sight between the audiovisual device and the wired communications line.

Preferably, transmitting the diffuse radiation includes coding the electrical signals to produce infrared pulses, and transmitting the electrical signals includes decoding the infrared pulses to produce electrical signals.

Preferably, transmitting and receiving the diffuse infrared radiation includes transmitting radiation to and receiving radiation from a plurality of devices.

Preferably, receiving the radiation includes receiving radiation from a peripheral device, most preferably from a user interface device.

In a preferred embodiment, transmitting and receiving the radiation includes transmitting and receiving radiation during predetermined time slots using a carrier-wave-based modulation scheme and/or using a TDMA scheme. Further preferably, transmitting and receiving the radiation includes transmitting and receiving in a half-duplex mode or, alternatively, in a full-duplex mode.

Preferably, transmitting and receiving the electrical signals includes transmitting signals to and receiving signals from a computer network.

Further preferably, transmitting and receiving the infrared radiation includes transmitting and receiving data at a rate greater than or equal to 1 Mbps.

Preferably, transmitting and receiving the infrared radiation includes transmitting and receiving radiation between an outlet of the wired communications line and the audiovisual device substantially without the use of a relay transmitter therebetween.

The present invention will be more fully understood from the following detailed description of the preferred embodiments thereof, taken together with the drawings in which:

BRIEF DESCRIPTION OF THE DRAWINGS

FIG. 5A is a schematic block diagram of a base unit in the link of FIG. 2, in accordance with an alternative embodiment of the present invention;

FIG. 5B is a schematic block diagram of a remote unit in the link of FIG. 2, in accordance with an alternative embodiment of the present invention;

FIG. 5C is a schematic timing diagram illustrating a time-division multiple access (TDMA) scheme for use with the base and remote units of FIGS. 5A and 5B, in accordance with a preferred embodiment of the present invention;

DETAILED DESCRIPTION OF PREFERRED EMBODIMENTS

Figure 1:
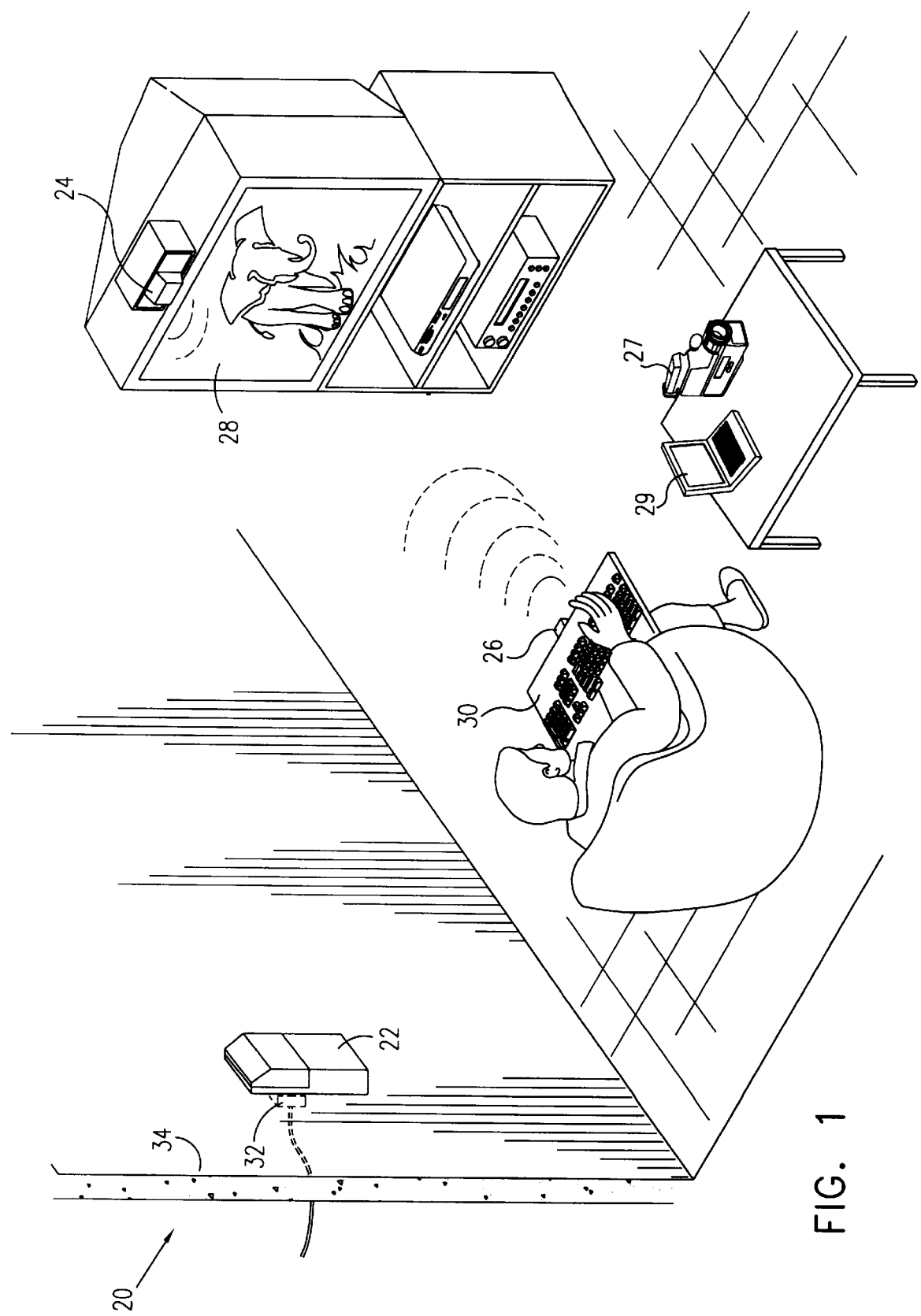
FIG. 1 is a schematic, pictorial illustration showing a wireless communications link in accordance with a preferred embodiment of the present invention.

Reference is now made to FIG. 1, which is an illustration of a network communications link 20, in accordance with a preferred embodiment of the present invention. Link 20 comprises a base unit 22, which transmits and receives modulated diffuse IR radiation to/from remote units 24 and 26. Remote unit 24 is preferably located on, or built into a web-enabled television 28. Remote unit 26 is preferably located in or fixed to a keyboard 30.

Alternatively or additionally, base unit 22 may transmit and receive radiation to/from remote units located on or built into a digital camera 27 or a personal data assistant 29.

Link 20 enables a user of television 28 to communicate over the Internet or other computer network through base unit 22. The term "web-enabled" as used herein means that the television includes circuitry for computer network communications, using the television screen as a computer monitor.

It is noted that although in FIG. 1 the remote units are in the preferred form of printed circuit boards installed in television 28 and keyboard 30, the remote units may also be fabricated in different forms. Other preferred forms include external assemblies that can be plugged into the television, keyboard or other remote device.

Base unit 22 is connected to a wired communication line 32, preferably a telephone wire, located in a wall 34. In the present invention, base unit 22 communicates with remote units 24 and 26 via diffuse IR radiation, and therefore the location of base unit 22 on wall 34 does not have to be in the line of sight (LOS) of remote units 24 and 26. The wireless communication link may be created by the reflection of the diffuse IR radiation form wall 34, or from other surfaces within a radius of several meters at least.

Figure 2:
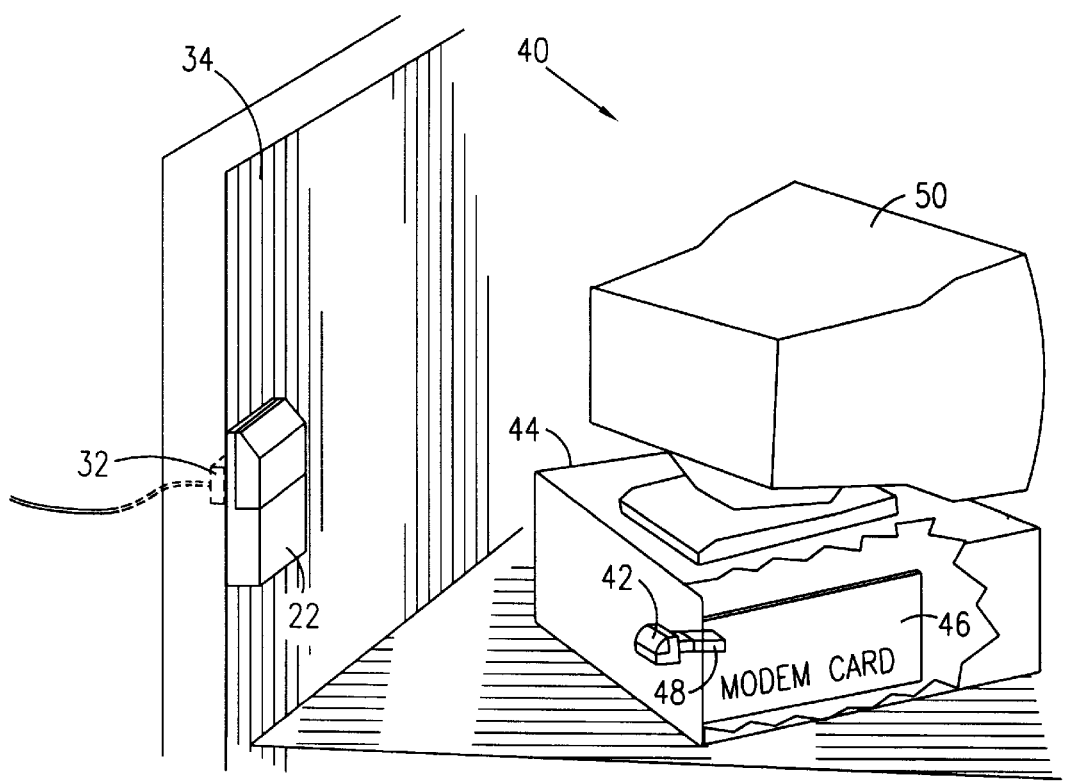
FIG. 2 is a schematic, pictorial illustration showing a wireless communication link in accordance with another preferred embodiment of the present invention.

FIG. 2 is an illustration of a network communications link 40 in accordance with another preferred embodiment of the present invention. Base unit 22 transmits and receives modulated diffuse IR radiation to/from remote unit 42. Remote unit 42 preferably connects to a connector 48 located on a modem card 46, installed in a personal computer 50. Base unit 22 is connected to a wired communication line, substantially as described above. In this case, link 40 enables a user of computer to communicate over a computer network. Remote unit 42 is preferably self-contained and plugs into connector 48 on the rear panel of the computer, as shown in the figure.

Figure 3A:
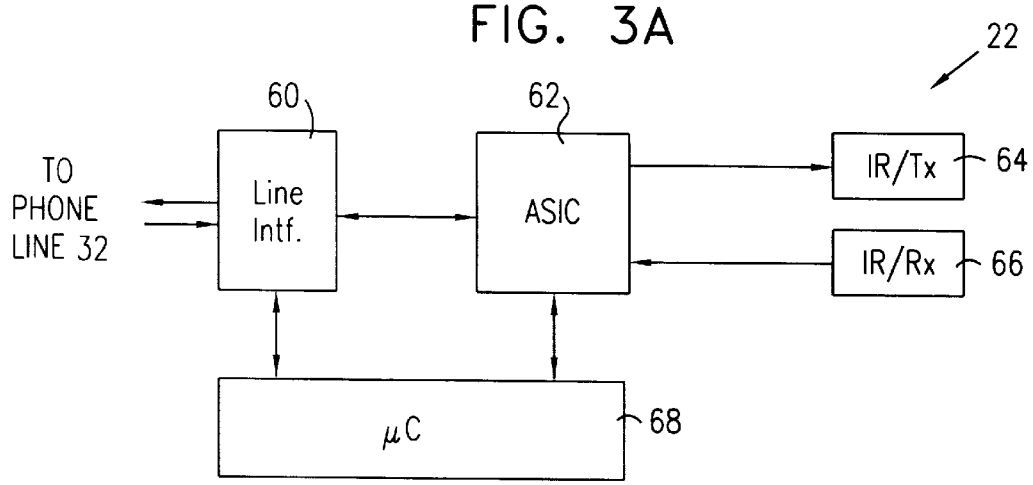
FIG. 3A is a schematic block diagram of a base unit in the link of FIG. 1, in accordance with a preferred embodiment of the present invention.

FIG. 3A is a schematic block diagram of base unit 22. Wired communication line 32 is linked to a line interface chip 60, for example, a Cermtec DAA model CH1837, in the base unit. Chip 60 receives and demodulates electrical signals from line 32, as is well known in the communications art, and conveys the demodulated signals to an ASIC chip 62. ASIC 62 preferably comprises a FPGA, and includes a CODEC and modulator and demodulator blocks. Such blocks are known in the art, and the design and production of ASIC 62 are within the capabilities of those skilled in the art of semiconductor devices. ASIC 62 encodes the electrical signals from chip 60 as pulses which drive an IR transmitter 64, which preferably comprises an LED with suitable driver circuitry. The IR signals transmitted by transmitter 64 are received by remote units 24 and 26, as described below.

Unit 22 further includes an IR receiver 66, comprising a photodiode with suitable optics for receiving diffuse IR signal from remote units 24 and 26. ASIC 62 receives electrical signals from receiver 66, decodes these signals and conveys them to chip 60. The chip generates appropriately modulated signals for transmission over line 32.

The transmission and reception of the data by chip 60 and ASIC 62 are controlled by a microcontroller 68, which performs line switching and signaling functions. Microcontroller preferably comprises a Philips 8051 microcontroller chip. Alternatively, the microcontroller may be embedded in ASIC 62. Unit 22 is preferably powered by rechargeable batteries (not shown in the figure), which are preferably recharged from the telephone line power.

Figure 3B:
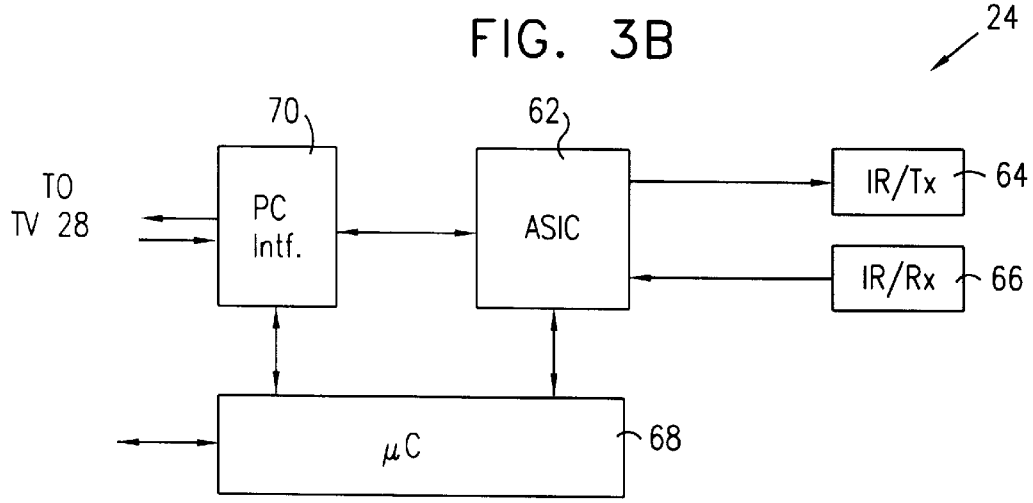
FIG. 3B is a schematic block diagram of a remote unit in the link of FIG. 1, in accordance with a preferred embodiment of the present invention.

FIG. 3B is a schematic block diagram of remote unit 24. Remote unit 24, in its preferred configuration, comprises a printed circuit card which is installed in an audiovisual device, such as television 28.

The circuitry of television 28, preferably personal computer circuitry embedded in the television, connects to a personal computer (PC) interface chip 70 in unit 24. Chip 70 may be identical to line interface chip 60, shown in FIG. 3A, and interacts with ASIC 62 and microcontroller 68 in a manner substantially similar to that described in detail above with reference to chip 60 in unit 22.

Figure 3C:
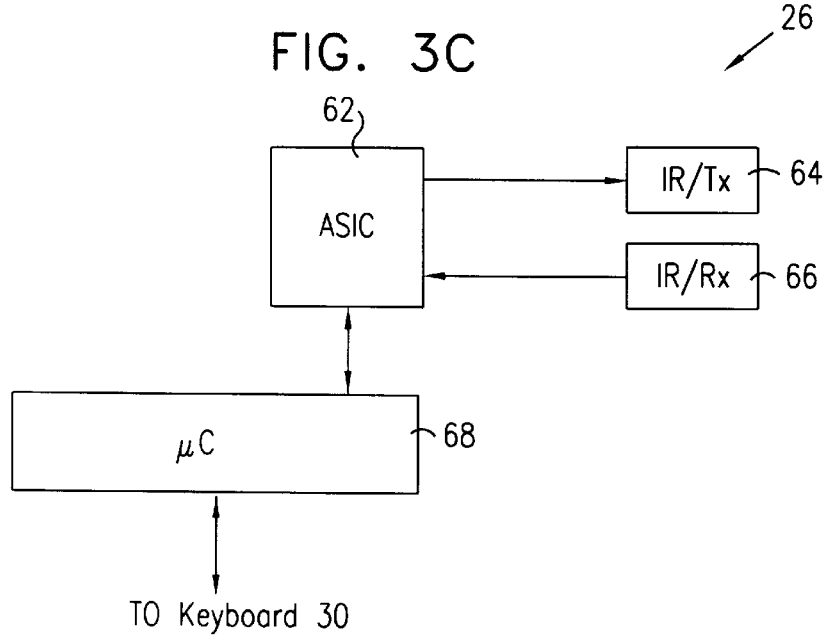
FIG. 3C is a schematic block diagram of another remote unit in the link of FIG. 1, in accordance with a preferred embodiment of the present invention.

FIG. 3C is a schematic block diagram remote unit 26. Remote unit 26, in its preferred configuration, comprises a printed circuit card which is installed in a peripheral device, such as keyboard 28. ASIC 62, located on unit 26, communicates with IR transmitter 64 and IR receiver 66 in a manner similar to that described in detail above. Microcontroller 68 receives user input data from keyboard 30 in a manner well known in the art, and conveys the data to ASIC 62 for transmission via transmitter 64, as described above.

In an alternative preferred embodiment, the functions of some or all of the components in units 22, 24 and 26, including chip 60, ASIC 62, IR transmitter 64, IR receiver 66, microcontroller 68 and chip 70, may be incorporated into one device or component, and relevant modules in that device may be enabled as applicable.

Figure 4:
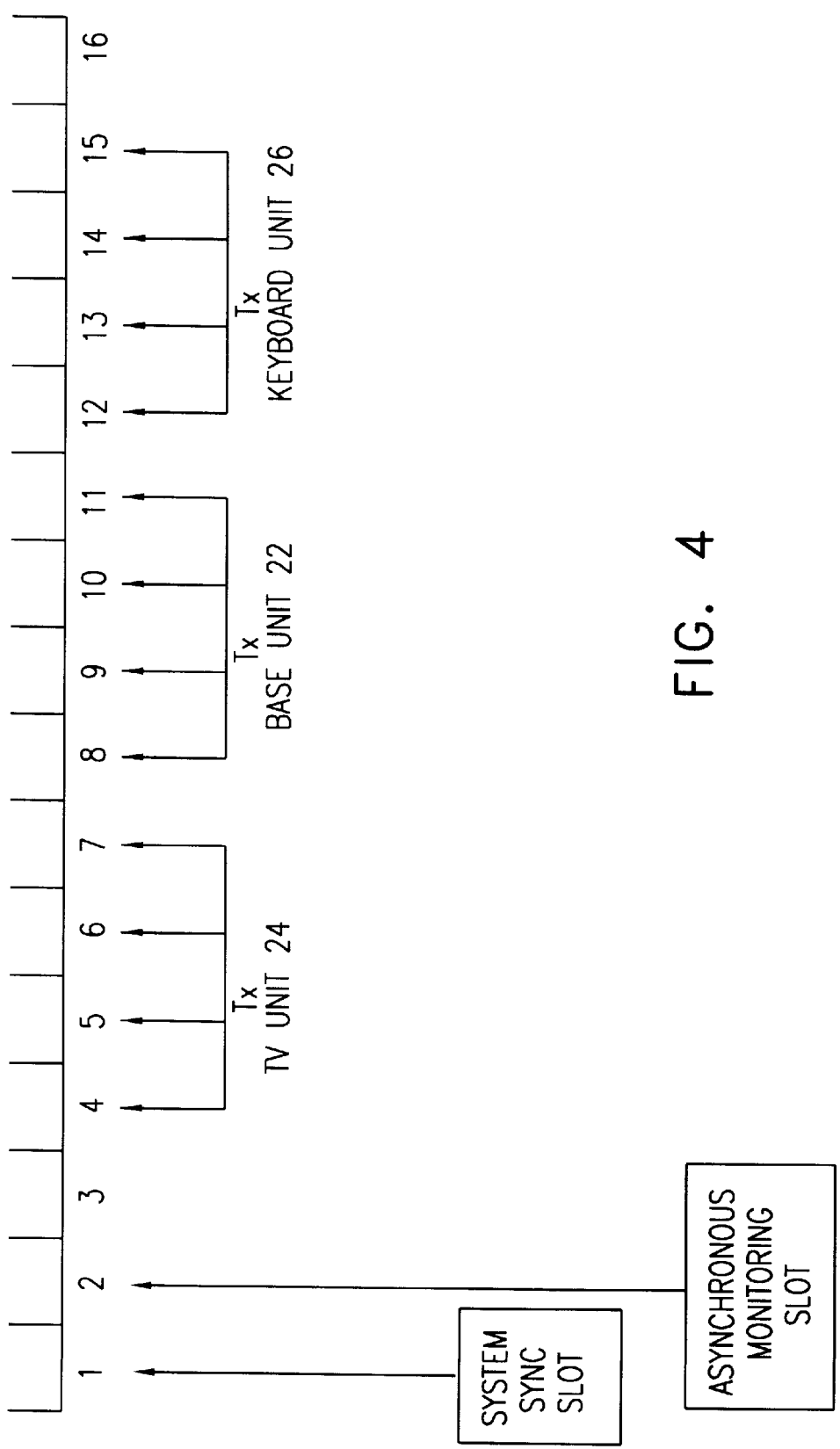
FIG. 4 is a schematic timing diagram illustrating a time-division multiple access (TDMA) scheme used in the link of FIG. 1, in accordance with a preferred embodiment of the present invention.

FIG. 4 is a schematic timing diagram representing a time-division multiple access (TDMA) scheme, or time sequencing, for transmission and reception of IR signals by units 22, 24 and 26 making up link 20, in accordance with a preferred embodiment of the present invention. As shown in FIG. 4, each communication frame is divided into multiple time slots. Preferably, the data transmission rate is between 192 kbps and 2 Mbps. In the example shown in the figure, there are 16 time slots in a frame, the transmission rate is 1.024 Mbps, and each slot includes 64 bytes of data. Thus, each slot occupies 0.5 msec, and the frame length is 8 msec. Other data rates and TDMA schemes may also be used, however. The TDMA scheme facilitates orderly data transfer over link 20, with as many as four different transmit/receive units operating simultaneously, and avoids data/communication overlap among the units.

One unit, preferably unit 24, connected to the computer, acts as the master, with all the other units as slaves. Unit 24 issues a System Sync signal during the first slot, which synchronize the other (slave) units. The slave units, which are normally in a low-power standby mode, use the second time slot to signal master unit 24 to enter an active communication mode. Slots 4, 5, 6 and 7 are allotted for master unit 24 to transmit signals to the slaves. During times other than the allotted time, unit 24 receives signals from units 22 and 26. Unit 22 is slotted to transmit in slots 8, 9, 10 and 11, and similarly, keyboard unit 26 slotted in slots 12, 13, 14 and 15.

FIGS. 5A and 5B are schematic block diagrams illustrating a base unit 70 and a remote unit 80, respectively, in accordance with an alternative embodiment of the present invention. Base unit 70 and remote unit 80 may be used, for example, in place of base unit 22 and remote unit 42, respectively, in link 40, as shown in FIG. 2. Units 70 and 80 each comprise a line interface chip 72, which is preferably of a type suitable for interfacing to a PSTN telephone line, as is known in the art. Each of units 70 and 80 also comprises a two-channel, full-duplex analog transceiver 74, coupled to IR transmitter 64 and IR receiver 66 and controlled by microprocessor 68. These transceivers enable units 70 and 80 to communicate with one another over a full-duplex analog link at two carrier frequencies (CARRIER 1 and CARRIER 2 in the figure), preferably between 2 and 10 MHz, for example, 3.6 and 4.0 MHz.

FIG. 5C is a schematic timing diagram representing a full-duplex TDMA scheme based on carrier wave modulation, for transmission and reception of IR signals by units 70 and 80, in accordance with a preferred embodiment of the present invention. One of the units, for example, unit 70, is chosen to be the master unit, and transmits signals over CARRIER 1 while receiving signals over CARRIER 2. The other unit, in this case unit 80, functions as a slave, receiving signals on CARRIER 1 and transmitting on CARRIER 2. As in the example of FIG. 4, each communication frame is divided into multiple time slots. Following a synchronization slot, two slots are preferably respectively allocated for units 70 and 80 to transmit two channels of data, so as to communicate with one another and with any peripheral units, such as keyboard 30, shown in FIG. 1. Thereafter, time slots (marked P1, P2 and P3) are allocated to the peripheral units, to communicate with units 70 and 80. It will be understood that greater or lesser numbers of time slots, data channels and peripheral units may similarly be used.

Figure 6A:
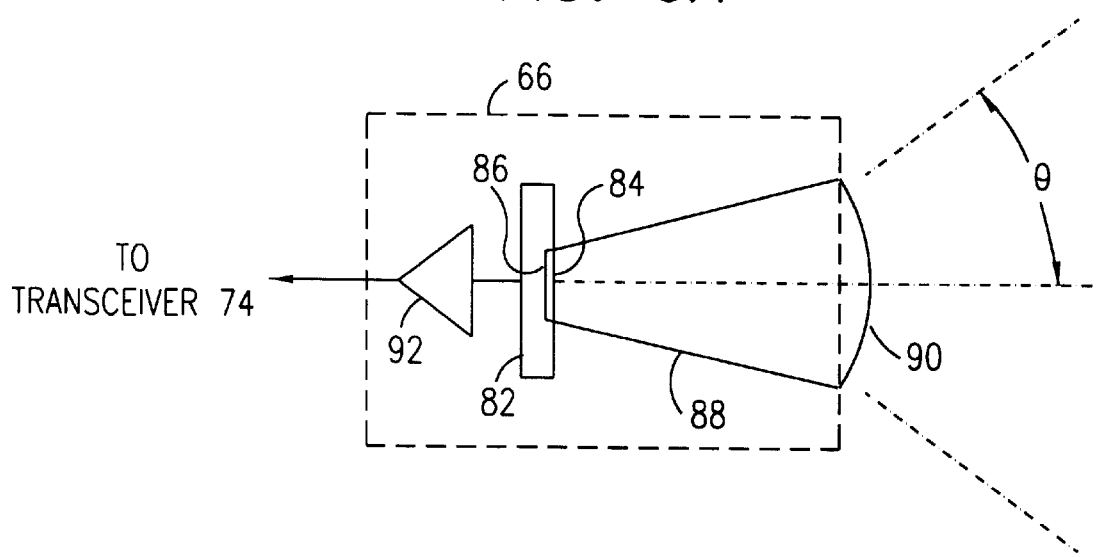
FIG. 6A is a schematic illustration of an optical receiver, for use in the base and remote units of FIGS. 5A and 5B, in accordance with a preferred embodiment of the present invention.

FIG. 6A is a schematic illustration showing details of IR receiver 66, in accordance with a preferred embodiment of the present invention. Receiver 66 is shown in FIG. 6A as communicating with transceiver 74, shown in FIGS. 5A and 5B, but it will be understood that this receiver may equally be used in any of the other base or remote units described herein.

Receiver 66 comprises a photodiode 82, which includes an optically active area 86, and whose output is preferably coupled via a preamplifier 92 to transceiver 74. A non-imaging dielectric totally-internally-reflecting concentrator 88 is optically coupled at an exit surface 84 thereof to area 86, preferably using a suitable optical bonding material. Concentrator 88 preferably comprises an optical plastic having a refractive index in the range 1.45 to 1.65, such as acrylic or polycarbonate, or alternatively may comprise an optical glass or other suitable dielectric material. Bonding material 84 preferably comprises optical epoxy or UV-cured optical cement, as are known in the art, and is chosen to give good index matching between concentrator 88 and active area 86 in order to reduce reflection losses. Alternatively, the entire assembly of receiver 66 may be molded as an integral unit, preferably by methods of injection molding known in the art.

Concentrator 88 has an acceptance angle θ, as shown in FIG. 6A, which is designed to meet the needs of a diffuse IR communications link, in accordance with preferred embodiments of the present invention, by proper selection of the shape of the concentrator and of an entrance surface 90 of the concentrator. In FIG. 6A, surface 90 is convex, so as to reduce the overall size of concentrator 88 while providing a relatively large acceptance angle, but a flat entrance surface may also be used. IR light passing through surface 90 undergoes total internal reflection at the side walls of concentrator 88, with the result that the concentrator has a high, substantially uniform light collection efficiency over substantially the entire acceptance angle θ. Preferably, concentrator 88 is designed to give θ in the range of 40–50° (half angle), which has been found to be optimal for diffuse IR communication links such as link 20 (FIG. 1) or link 40 (FIG. 2).

Although photodiodes with integral lenses are known in the art, their collection efficiency is typically non-uniform and may drop substantially at angles away from the optical axis. Such non-uniform response tends to cause poor and/or inconsistent reception in diffuse IR systems. By providing substantially uniform reception over a wide angle, receiver 66 using concentrator 88 improves the signal/noise ratio, reliability and insensitivity to angular alignment of IR communication links such as those described hereinabove.

Figure 6B:
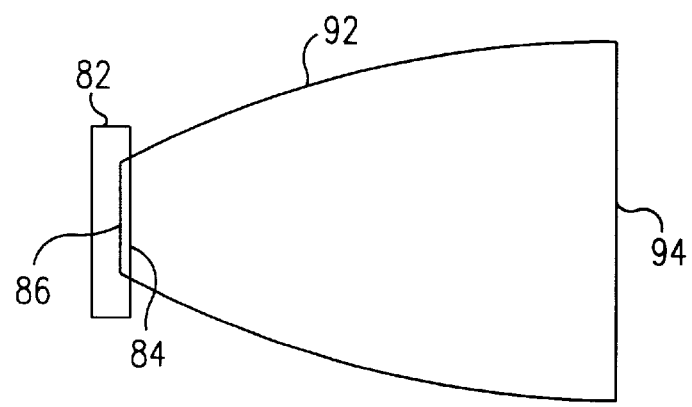
FIG. 6B is a schematic illustration of an optical receiver, for use in the base and remote units of FIGS. 5A and 5B, in accordance with another preferred embodiment of the present invention.

FIG. 6B is a schematic illustration showing a compound parabolic concentrator 92, coupled to photodiode 82, in accordance with another preferred embodiment of the present invention. Concentrator 92 has a generally flat entrance surface 94 and paraboloidal side walls. Light entering through surface 94 is concentrated onto active area 86 by internal reflection at the side walls, providing a high degree of concentration. Concentrator 92 is preferably produced and bonded to photodiode 82 substantially as described above with reference to concentrator 88.

Other types of concentrators may also be designed based on the principles of concentrators 88 and 92. For example, an astigmatic concentrator (not shown in the figures) may be designed to concentrate radiation in only one angular direction, but not in an orthogonal direction, in a manner similar to a cylindrical lens, or to concentrate radiation over a different acceptance angle in one direction than in the other. Alternatively or additionally, multiple photodiodes, each with its own concentrator and pointed in different directions, may be used together to provide wider angular coverage. It will further be appreciated that similar concentrators may be coupled to a LED or laser diode emitter in transmitter 64, in order to give uniform, wide-angle IR output therefrom. Such concentrators may be used in any of base or remote IR communication units 22, 24, 26, 42, 70 or 80, as described hereinabove, as well as in other diffuse IR communication links in accordance with the principles of the present invention.

It will be appreciated that the preferred embodiments described above are cited by way of example, and the full scope of the invention is limited only by the claims.

We claim:

1. A wireless communications link between a telephone line connector and at least one audio-visual device, said communications link comprising:
   a telephone line side unit including:
      a telephone line side connector for engagement with said telephone line connector for bidirectional audio-visual data communication, providing communication between a telephone line and at least one audio-visual device;
      a telephone line side infrared transmitter which transmits diffuse infrared radiation corresponding to said signal communication; and
      a telephone line side infrared receiver which receives diffuse infrared radiation corresponding to said signal communication; and
   an audio-visual device side unit including:
      an audio-visual device side connector for engagement with said audio-visual device for bidirectional signal communication therewith via a modem;
      an audio-visual device side infrared transmitter which transmits diffuse infrared radiation to said telephone line side infrared transmitter; and
      an audio-visual device side infrared receiver which receives diffuse infrared radiation from said telephone line side infrared transmitter.

2. A wireless communications link according to claim 1 and wherein said audio-visual device comprises a television.

3. A wireless communications link according to claim 2 and wherein said signal communication comprises internet television communication.

4. A wireless communications link according to claim 1 and wherein said telephone line side unit also comprises a unitary housing enclosing said a telephone line side connector, said telephone line side infrared transmitter and said telephone line side infrared receiver.

5. A wireless communications link according to claim 1 and wherein said audio-visual device side unit also comprises a unitary housing enclosing said audio-visual device side connector, said audio-visual device side infrared transmitter, and said audio-visual device side infrared receiver.

6. A wireless communication link according to claim 1 and wherein said audio-visual device comprises a computer.

7. A wireless communications link according to claim 1 and wherein said audio-visual device side unit is incorporated in said audio-visual device.

8. A wireless communications link according to claim 1 and wherein said audio-visual device side unit is external to said audio-visual device.

9. A wireless communications link according to claim 1 and wherein said signal communication is full-duplex communication.

* * * * *